Aug. 1, 1944.    L. FABIAN    2,354,673
MACHINE TOOL
Filed May 14, 1941    2 Sheets-Sheet 1
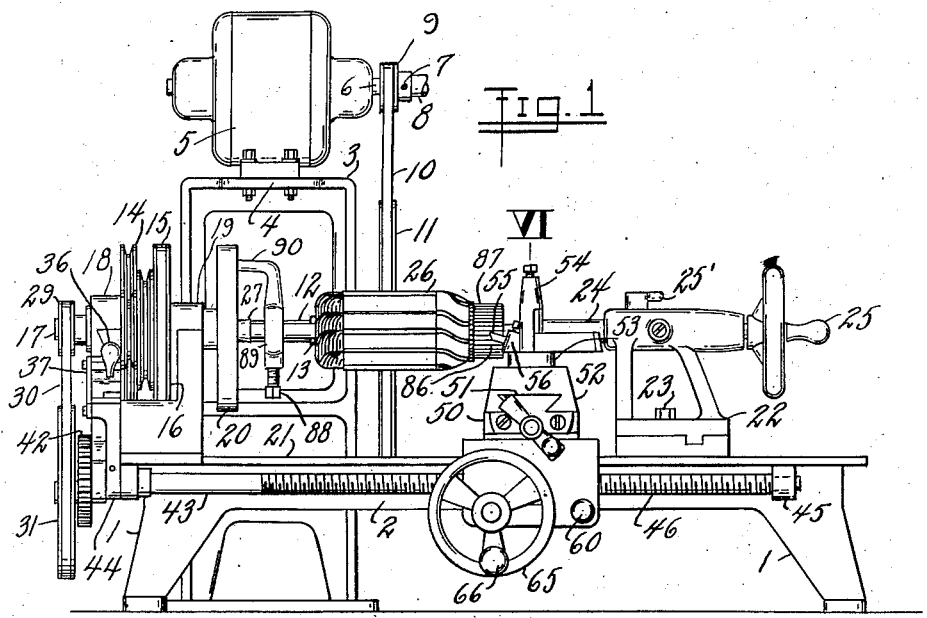
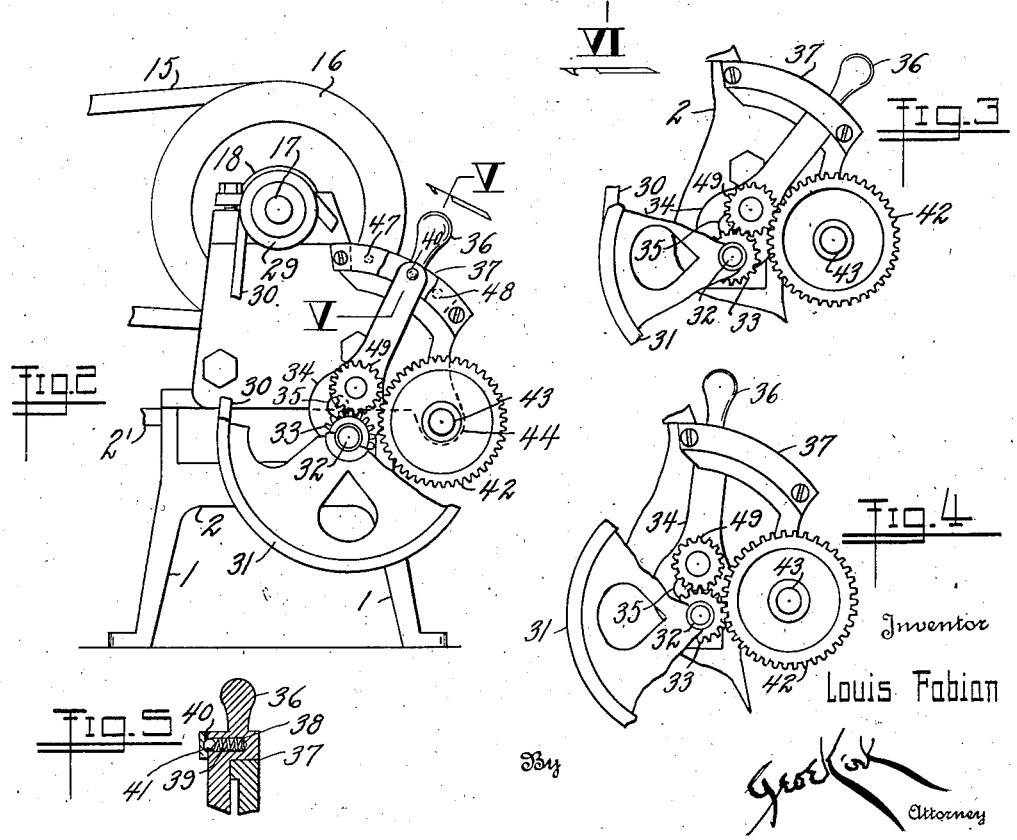
Inventor
Louis Fabian
By
Attorney Aug. 1, 1944.    L. FABIAN    2,354,673
MACHINE TOOL
Filed May 14, 1941    2 Sheets-Sheet 2
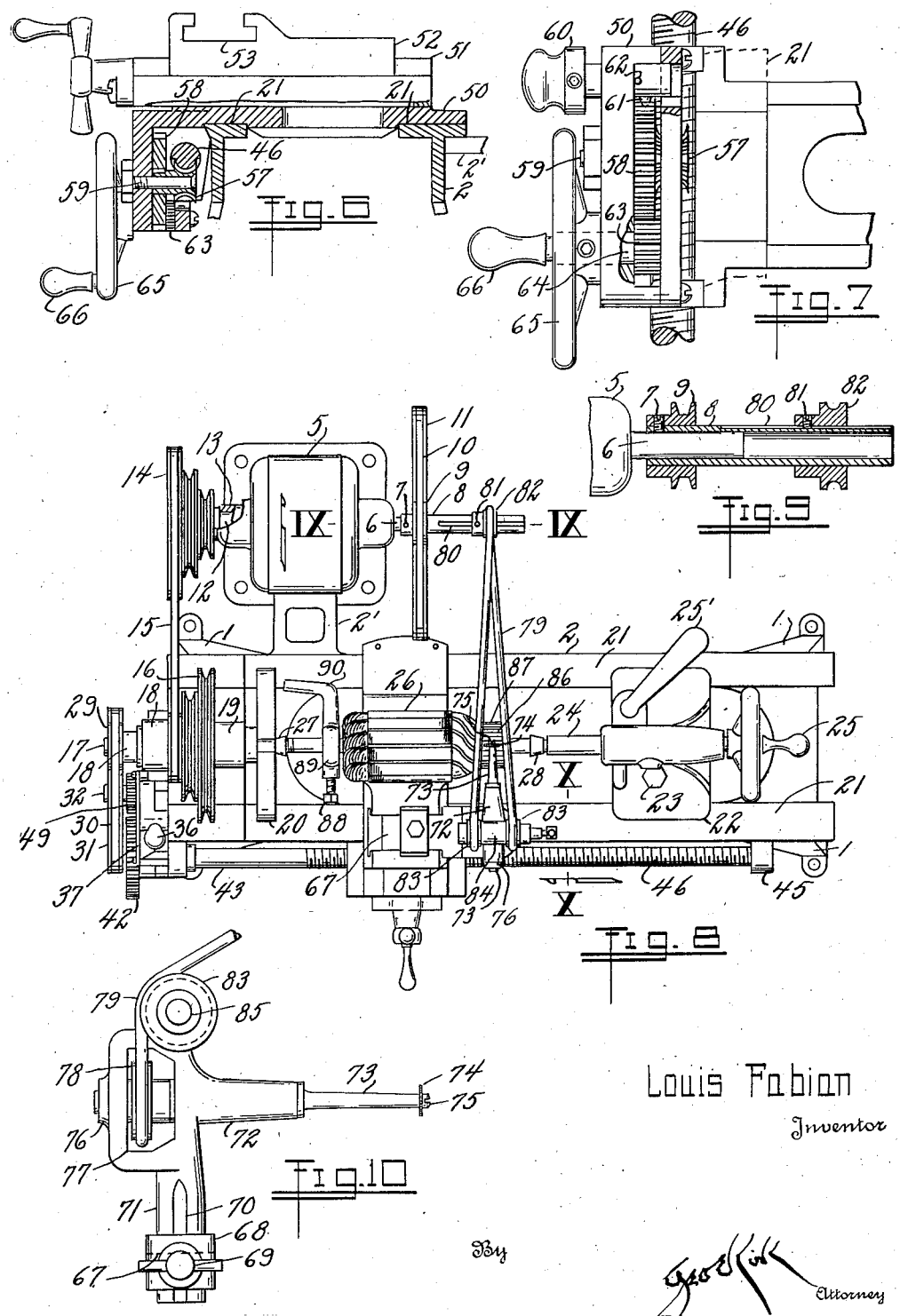
Louis Fabian
Inventor Patented Aug. 1, 1944

2,354,673

UNITED STATES PATENT OFFICE 2,354,673

MACHINE TOOL

Louis Fabian, Toledo, Ohio, assignor to Stephen Lovrenchich, Toledo, Ohio

Application May 14, 1941, Serial No. 393,349

3 Claims. (Cl. 90—15.1)

This invention relates to locating and driving as well as to holding cutting elements.

This invention has utility as a lathe with special adaptation to conditioning or reconditioning commutators of dynamo electric machines and has a wide field for use in equipment such as the automotive type.

Referring to the drawings:

Fig. 1 is a side elevation of an embodiment of the invention in a bench type of lathe adapted to act upon work as undergoing rotation;

Fig. 2 is a detail view, with parts broken away, from the left of Fig. 1, showing the drive for the feed device or lead screw;

Fig. 3 is a view of this feed device in transmission relation in direct drive when the pinion eccentric with this shifted pulley is brought directly in mesh with the gear on the screw feed;

Fig. 4 is a fragmentary view in reverse position, wherein the transmission from the pulley is direct, not through an intermediate pinion, and thus gives reverse direction of feed rotation to the feed screw;

Fig. 5 is a section, on the line V—V, Fig. 2, showing the yieldable set position for the controlling lever as to this feed, which is in disconnected or idle position in Fig. 2;

Fig. 6 is a section, on the line VI—VI, Fig. 1, showing features of the mounting for the cutting tool as on the slide and in position to be controlled by the lead screw;

Fig. 7 is a bottom plan, with parts broken away, of this cutting tool mounting of Fig. 6;

Fig. 8 is a plan view of the machine tool of Fig. 1, with the undercutter in position;

Fig. 9 is a detail view, on the line IX—IX, Fig. 8, showing the motor drive shaft connection for mounting the belt pulley to drive the undercutter; and Fig. 10 is a view of the post of column carrying the undercutter in the cutting tool mounting.

Legs 1 (Figs. 1, 8) mount frame 2, from which spacer 2' extends to supplemental frame 3 having deck 4, on which is mounted motor 5 having drive shaft 6 adapted to be engaged by set screw 7 to mount sleeve 8 carrying pulley 9. This pulley 9 may be an element in the speed reduction drive through V-belt 10 to pulley 11 on shaft 12 carried in bearings 13 in the supplemental frame 3 parallel to the motor shaft 6. This shaft 12, laterally of the supplemental frame 3 away from the pulley 11, has stepped grooved pulley 14, from which extends V-belt 15 to complementally stepped grooved pulley 16 on shaft 17 mounted in bearings 18, 19, for positioning holder 20 above parallel slide guides 21 of the frame 2. Remote from this rotary holder or chuck device 20, there is opposing holder device 22 slidable on the guides 21 in position to be held therewith by clamp nut 23. Aligned with this shaft 17 in the holder device 22 is holder element 24, adjustable toward and from the holder 20 by hand wheel 25 and locked in position by arm 25'. Accordingly, this holder device 22 may be positioned as to the holder 20, locked by the arm 23, and supplementally adjusted as to the stem 24 by the wheel 25 for engaging an article of work, say armature 26 having seat portions 27, 28, to cooperate with the opposing aligned holders 20, 24.

The shaft 17, adjacent the bearing 18, has pulley 29 (Figs. 1, 8), from which extends V-belt 30 about larger pulley 31 on stub shaft 32 having fixed therewith pinion 33 (Fig. 2). This stub shaft 32 has bearing in arm 34 having eccentric of the pulley 31 pivot bearing 35 in the frame 2. This arm 34 has handle 36 for swinging this arm 34 on this pivot bearing 35 as an axis. This movement of the arm 36 is at segment 37. The arm 34 has socket 38 with spring 39 (Fig. 5) to thrust ball 40 into mid-seat 41, thereby holding the arm 34 in neutral or non-transmission position. Thrusting of such arm 36 upward or toward the shaft 17 swings the pulley 31 (Fig. 4) so that the pinion 33 fixed therewith comes directly into mesh with gear 42, fixedly mounted on lead screw shaft 43 in bearing 44 of the frame member 2 and extending therefrom to bearing 45. This lead screw 43 is thereby rotatably mounted parallel and in alignment between the holders 24, 17, as well as parallel to the motor shaft 6 and the intermediate drive shaft 12 and the variable speed reduction transmission shaft 17. This shaft 43 has thereon threaded portion 46 as a screw or worm. In this shifting to forward drive or feed position in the operation of this lead screw 43 the ball 40 enters holding position or socket 47, and thus tends yieldably to hold the transmission in this forward drive relation.

For reversal of this drive relation as to the feed screw, the handle 36 is shifted away from the socket 47 past the socket 41 to have the ball 40 enter socket 48 (Fig. 3). At this position the pinion 33 is out-of-mesh with the gear 42, and transmission from this pinion 33 is through idle gear 49, which in this throwing of the arm 34 has cleared the pinion 33 from the gear 42 and brought the pinion 49 rotatively into mesh with the gear 42. In each of these transmission relations, the live shiftable pinion picks up its mesh relation whether for forward or reverse with the driven gear 42, even with the motor 5 running.

Mounted on these guides 21, between the holder device 22 and the bearing 14, is tool mounting 50 (Fig. 1). This mounting 50 has dovetail guide 51 crosswise or between the guides 21, thereby effective to shift supplemental guide 52 directly crosswise of the transit relation which this mounting 50 may have in its slide toward or from the holder 20. This auxiliary or secondary guide 52 may have herein, parallel to the guides 21, 21, additional guide-way 53. On this may be mounted post 54 for locating cutting tool 55 in clamp device 56 in such desired position as may be appropriate in connection with the work being undertaken, wherein there is the feed or fixed holding of the tool as to the work. In the event the work be rotated the tool may be progressed therealong.

In this progression of the tool, such may be effected automatically herein through location in this mounting 50 of worm wheel 57 (Figs. 6, 7) fixed with gear 58 and mounted on shaft 59. This worm wheel 57 is thus in mesh with the worm 46 of the lead screw. In this mounting 50 is non-rotary plunger 60 having tooth 61. As this plunger 60 is drawn outward from the mounting 50 to have pin 62 determine the limit therefor, this tooth 61 is in mesh with the gear 58 and thereby locks such against rotation. Accordingly, the rotation of the lead screw 43 would thereby tend to cause travel in the feed or reverse direction according to the setting of this handle 36. To release this device from feed relation, the plunger 60 is thrust toward the frame for the mounting 50 and the tooth 61 is thereby cleared of this gear 58. Oppositely from this plunger 60 and in this mounting 50 is located pinion 63 on shaft 64 carrying hand wheel 65 with handle 66. Accordingly, with this tooth 61 clear of the pinion 58, the handle 66 of the hand wheel 65 may be operated, thereby supplementing the feed rate in the event the screw 43 be operating, or to reverse in the event there is purpose to retrace or go over a region of work. Furthermore, with this feed screw idle, say with the handle 36 located in neutral or mid-position, the feed may be manually controlled through this handle 66 of the hand wheel 65. There is thus a flexibility for range of operation with the cutting requirement and this range for flexibility is of special value in reconditioning equipment.

Supplementally herein, in lieu of the secondary mounting 52, there may be located in the slide 53 secondary mounting 67 (Figs. 8, 10), terminally carrying a socket or eye 68, wherein clamping screw 69 may engage spline way 70 in stem or column 71 of the tertiary mounting, herein providing bearing 72 for actuator shaft 73 mounting rotary cutter disk 74 as assembled therewith by set screw 75. Spaced from the bearing 72 is bearing 76. There is between the bearings 76 and 72 an opening 77 in which is located pulley 78, about which may pass round belt 79 to drive the shaft 73.

This sleeve 8 has from the pulley 9 a spline 80, which may be engaged by set screw 81 for rotatively holding therewith pulley 82. There is thus a range for adjusting this pulley 82 toward and from the pulley 9, and thereby a range for locating the round belt 79 for the reaches therefrom to approximate mid-position in the transit of the cutting tool 74 as along the feed screw 43. These reaches 79 from the pulley 82 pass over idle pulleys 83, one on each side of bearing 84 mounted on shaft 85. These reaches are thus guides in the extent of the belt 79 to and about the drive pulley 78 for rotating the actuator shaft 73.

In practice, for using this rotary cutter say as an undercutter for slots 86 between commutator bars 87, location of the pulley 82 is approximately medially of the length of the working range for the slots 86 as cut between the commutator bars 87. In such operation it is desirable the armature 26 be not driven from the shaft 17. During the driving rotations, say for operation of the cutting tool 55, set screw 88 in eye 89 may anchor arm 90 with the shaft to the armature, and with this arm 90 located in a slot or seat in the plate 20 there is a rotation for the armature 26 to be acted upon by the cutting tool 55.

However, in the undercutting operation as effected by the rotary disk 74, this holding device 90 may be clear of the holder 20, and the armature 28 given the manual step-by-step location, for the cutting disk 74 to be in transit and rotated. The transit may be from the operation of the feed screw 43 or be effected manually through the handle 66 for the hand wheel 65.

The disclosure herein is a simple type of lathe of efficient set up for conditioning, especially the rotors in electrical machinery. There may be dressing down of the cylindrical portions by the cutting tool, say mounted as to the tool 55 and adjusted to the desired position. As to the commutators, these may be circumferentially dressed and then therebetween the slots may be cut, by displacing the tool 57 and the clamp 56 and in lieu thereof introducing the rotary cutter and its mounting (Fig. 10). This tool is accordingly one which may be readily operated at one jigging of the rotor in the set-up herein.

What is claimed and it is desired to secure by Letters Patent is:

1. For a lathe embodying a frame, opposing work holders mounted on the frame, a feed screw extending longitudinally of the frame, a carriage moved by the feed screw, a motor mounted on the frame for driving said feed screw, said motor having an extended shaft whereon driving means may be placed, the combination of a milling cutter and shaft mounted on the carriage, a pulley on the cutter shaft, a pulley on the motor shaft adjustable toward and from the motor, and a belt between said pulleys, the position of said adjustable pulley being medially of the extreme movements of the cutter pulley in cutter operation.

2. For a lathe embodying a frame, opposing work holders mounted on the frame, a feed screw extending longitudinally of the frame, a carriage moved by the feed screw, said carriage having a seat for a post, a motor mounted on the frame for driving said feed screw, said motor having an extended shaft whereon driving means may be placed, the combination of a milling cutter and shaft having a frame provided with a post to engage the post seat and thereby mounted on the carriage, a pulley on the cutter shaft, a pulley on the motor shaft adjustable toward and from the motor, and a belt between said pulleys, the position of said adjustable pulley being medially of the extreme movements of the cutter pulley in cutter operation.

3. For a lathe embodying a frame, opposing work holders mounted on the frame, a feed screw extending longitudinally of the frame, a carriage moved by the feed screw, a slide on the carriage having a vertical seat for a post, a motor mounted on the frame for driving said feed screw, said motor having an extended shaft whereon driving means may be placed, the combination of a milling cutter and shaft having a frame provided with a post adapted to be adjustable as to the post seat and thereby mounted on the carriage, a pulley on the cutter shaft, a pulley on the motor shaft adjustable toward and from the motor, and a belt between said pulleys, the position of said adjustable pulley being medially of the extreme movements of the cutter pulley in cutter operation.

LOUIS FABIAN.